Patented Aug. 31, 1948

2,448,152

UNITED STATES PATENT OFFICE 2,448,152

PROCESSES FOR CONTROLLING POTATO CHIP COLOR

Alva R. Patton, Fort Collins, Colo.

No Drawing. Application January 27, 1947, Serial No. 724,715

8 Claims. (Cl. 99—100)

This invention relates to a process for the manufacture of potato food products and more particularly to the type of product known as potato chips and consisting of thin potato slices fried in deep fat until crisp.

There are two entirely separate and distinct causes of discoloration of potatoes and potato products. One is due to enzyme action. This type of discoloration is well known. The methods of obviating it are standard practice in the food industries, and it has no bearing on the present invention.

Potato chip processors experience considerable difficulty in producing a product of uniform color, crispness and flavor, since they are at the mercy of a variable natural raw material. In spite of care in selection, curing, and frying chip losses are incurred due to occasional potato lots which if completely fried turn too dark in color and attain an objectionable flavor, which makes the chips unattractive and unpalatable. A light golden color is desired in such food products; if browning proceeds beyond a certain point the product is unmarketable.

The principal object of this invention is to provide a method and means for the elimination of undesirable darkening or browning during the manufacture of potato chips and other deep-fat-fried potato food products.

The second cause of discoloration, however, has only recently been recognized by the food industry. It does not involve enzyme action, but occurs spontaneously under the influence of heat. The causes thereof, and methods for its control have not heretofore been developed.

In the development of the present invention it has been found that the record cause of discoloration in potato chips is due to two types of compounds which are naturally present in the potato tissue. These two types of compounds herein referred to as types A and B, interact spontaneously under the influence of the heat of frying to produce objectionable browning. Both types of compounds must be present simultaneously in order for browning to occur and both are normally present in potatoes. The total and the relative quantities present, however, vary widely with variety, growing conditions, storage history, etc. of the potatoes. The non-uniformity in amount explains the variability in degree of browning which occurs during the deep-fat-frying of potato chips and similar products. Control of the quantities of chips and either or both of these compounds therefore will result in control of the resulting browning.

The chemical nature of these two types of compounds is as follows: Type A is a reducing compound of the class known as reducing sugars. It consists chiefly of glucose with perhaps lesser amounts of other reducing sugars; and type B is a nitrogen compound of the general type known as amines, principally amino acids, such as glutamic acid, and their derivatives such as glutamine and/or proteinaceous substances.

Complete identification of all the compounds involved is not necessary. It is sufficient to know and understand their general chemical nature. Hereinafter, both types of compounds, taken collectively, will be referred to as the "browning reactants."

The essential feature of the present invention involves the discovery that the browning of potato chips may be controlled at any desired level by controlled extraction of either or both the browning reactants from the potato slices preliminary to frying.

Briefly, the process for extraction of the browning reactants consists of immersing the potato pieces, before frying, for a period of time, dependent upon product requirement, in a hot aqueous alkaline earth salt solvent, such as a calcium or magnesium salt solution, under the influence of heat. The most suitable solvent found is a hot solution containing a calcium ion concentration equivalent to that furnished by a 0.25% calcium chloride solution. Other calcium compounds may be used, such as calcium sulfamate, or magnesium compounds, such as magnesium chloride. Magnesium compounds, however, are not generally desirable in a food product unless combined with a calcium compound.

The presence of an adequate concentration of calcium and/or magnesium ions is necessary to maintain the insolubility of pectic substances so as to prevent loss thereof with resulting concomitant deterioration in texture and flavor of the finished product. The heat is necessary to partially gelatinize the potato starch so as to increase the permeability of the potato substance and render the browning reactants accessible to the action of the solvent.

As an example potato slices selected from lots which, when treated by the customary processes, fried too brown and had a scorched taste, were treated by immersing the raw slices for three minutes in a 0.25 per cent calcium chloride solution at a temperature just below the boiling point. When fried these treated chips had a uniform pale golden color and excellent flavor and texture.

The color of the final product can be controlled at any desired shade by regulating the time in the extraction bath. Furthermore, the chips can be fried at a higher temperature and to a greater degree of dehydration without the appearance of undesirable browning.

The present invention permits not only year round production of uniformly-colored potato chips regardless of the browning potentialities of the potato supply; it also makes possible an improvement in the quality of the chips. It is recognized that frying at higher temperatures is desirable because the product obtained contains less fat or oil and consequently is superior in appearance, palatability, and keeping quality. Nevertheless the processor is sometimes forced to use lower frying temperatures in order to prevent excessive browning. With the application of the present invention, the processor is freed from this necessity and is enabled to employ the desirable higher temperatures, with resultant improvement in quality, a saving in time, and a smaller consumption of frying material.

Another advantage of the present invention is the resultant decrease in storage costs and losses during storage. It is customary to store potatoes at a high temperature prior to frying to lower the reducing sugar content, a process known as "curing." This is an expensive procedure, and at the abnormally high temperatures used there is frequent loss from sprouting, shrinkage, respiration, and spoilage. Furthermore, it frequently happens that certain potato lots will not cure satisfactorily and cannot be used for chips because of excessive browning. The present invention contemplates the elimination of much of this costly and wasteful loss, since it eliminates "curing" and makes possible to immediately manufacture potato chips from the potatoes as received at the plant.

Attempts were made to accomplish the same results by means of plain hot water. These resulted in removing some of the browning reactants but also resulted in dissolving out a portion of the pectic substances with a resulting destruction of flavor. A lower temperature with plain water had no apparent result on removal of the browning reactants and an increase in time and temperature resulted in "cooked" taste which was not desirable in the resulting chips.

With the alkaline earth salt solution, however, all of the above faults were avoided. As before stated the time may be varied to attain the desired results on a given batch. The results may also be varied by temperature regulation. Experiments appear to limit the time range between 30 seconds and 10 minutes. Less time is useless; more time is destructive to product and flavor. The temperature range appears to be from 120° F. to the boiling point. Actual boiling is destructive to the chip structure.

Preferred solvents are:

(1) A hot aqueous solution containing from 50 parts per million to 10,000 parts per million of calcium chloride or an equivalent concentration of calcium ions from other sources;

(2) A hot aqueous solution containing a range of calcium ion concentration between 0.1 molar and 0.005 molar; or (3) A hot aqueous solution containing a range of magnesium ion concentration between 0.1 molar and 0.004 molar.

The hot water removes the browning reactants by simple extraction, and they are present unchanged in the hot water bath, diluted beyond a concentration at which they could cause browning. The calcium (or magnesium) ions do not react with the browning reactants, so far as known, but merely prevent the extraction by the hot water of non-browning substances in the potato which must remain in the potato for the sake of texture and flavor.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A method of producing deep-fat-fried potato products comprising: cutting the potato into pieces; immersing the pieces in a hot alkaline earth salt solution for from 30 seconds to 10 minutes; thence frying the pieces in deep fat.

2. A method of producing deep-fat-fried potato products comprising: cutting the potato into pieces; immersing the pieces in a solution of an alkaline earth salt solution heated to from 120° F. to the boiling point for a period of from 30 seconds to 10 minutes; thence frying the pieces in deep fat.

3. A method of producing deep-fat-fried potato products comprising: cutting the potato into pieces; immersing the pieces in a solution containing calcium chloride heated to from 120° F. to the boiling point for a period of from 30 seconds to 10 minutes; thence frying the pieces in deep fat.

4. A method of producing deep-fat-fried potato products comprising: cutting the potato into pieces; immersing the pieces in a solution containing from 50 to 10,000 parts per million of calcium chloride heated to from 120° F. to the boiling point for a period of from 30 seconds to 10 minutes; thence frying the pieces in deep fat.

5. A method for preventing discoloration during the frying of potato chips comprising dissolving out a portion of the reducing sugar and amines from the chips in a hot calcium sulfamate solution above 120° F. having a calcium ion concentration of from 0.1 molar for a period of from thirty seconds to ten minutes to 0.0004 molar prior to frying.

6. A method of controlling the final color of deep-fat-fried potato chips comprising: placing the raw chips in a hot alkaline earth salt solution allowing them to remain in said solution for a period of time sufficient to remove a portion of the natural reducing sugars and nitrogen compounds from said chips; removing the chips from said solution; and frying the removed chips in deep fat.

7. A method for preventing discoloration during the frying of potato chips comprising: dissolving out a portion of the reducing sugar and amines by immersing the chips in hot water containing magnesium chloride for a period from 30 seconds to 10 minutes prior to frying.

8. A method of producing deep-fat fried potato products comprising: cutting the potato into pieces; immersing the pieces in a solution containing magnesium chloride heated to from 120° F. to the boiling point for a period of from 30 seconds to 10 minutes; thence frying the pieces in deep fat.

ALVA R. PATTON.

REFERENCES CITED

The following references are of record in the file of this patent:

UNITED STATES PATENTS

| Number | Name | Date |
|---|---|---|
| 1,676,160 | Ruffner | July 3, 1928 |
| 2,191,835 | Snelling | Feb. 27, 1940 |
| 2,212,461 | Swartz | Aug. 20, 1940 |
| 2,333,873 | Martin | Nov. 9, 1943 |